United States Patent
Liao et al.

(10) Patent No.: US 12,410,299 B2
(45) Date of Patent: Sep. 9, 2025

(54) DISPOSAL METHOD FOR WASTE FABRIC CONTAINING POLYESTER, SPANDEX, AND DYE

(71) Applicant: NAN YA PLASTICS CORPORATION, Taipei (TW)

(72) Inventors: Te-Chao Liao, Taipei (TW); Jung-Jen Chuang, Taipei (TW); Zhang-Jian Huang, Taipei (TW); Tzu-Huan Wong, Taipei (TW)

(73) Assignee: NAN YA PLASTICS CORPORATION, Taipei (TW)

(*) Notice: Subject to any disclaimer, the term of this patent is extended or adjusted under 35 U.S.C. 154(b) by 856 days.

(21) Appl. No.: 17/689,966

(22) Filed: Mar. 8, 2022

(65) Prior Publication Data

US 2023/0131718 A1  Apr. 27, 2023

Related U.S. Application Data

(63) Continuation-in-part of application No. 17/568,730, filed on Jan. 5, 2022, now Pat. No. 12,269,077.

(30) Foreign Application Priority Data

| Oct. 21, 2021 | (TW) | 110139088 |
| Jan. 21, 2022 | (TW) | 111102619 |

(51) Int. Cl.
| C08J 11/28 | (2006.01) |
| C08J 11/14 | (2006.01) |
| C08J 11/16 | (2006.01) |

(52) U.S. Cl.
CPC ........... *C08J 11/28* (2013.01); *C08J 11/14* (2013.01); *C08J 11/16* (2013.01)

(58) Field of Classification Search
CPC ............. C08J 11/28; C08J 11/14; C08J 11/16
See application file for complete search history.

(56) References Cited

U.S. PATENT DOCUMENTS 3,696,058 A     10/1972  Teti
4,783,193 A  *  11/1988  Pensa .................. C08J 7/00
                                                 8/102

(Continued)

FOREIGN PATENT DOCUMENTS

| CN | 107849206 | 3/2018 |
| CN | 106146877 | 2/2019 |

(Continued)

OTHER PUBLICATIONS

Martin, A. Chapter 4. Colour Management in the Graphic Technologies-4.4 Lab Colour Space and Delta E Measurements. In Graphic Design and Print Production Fundamentals. Accessed at https://opentextbc.ca/graphicdesign/chapter/4-4-lab-colour-space-and-delta-e-measurements/. (Year: 2015).*

(Continued)

*Primary Examiner* — Christina H.W. Rosebach
(74) *Attorney, Agent, or Firm* — JCIPRNET

(57) ABSTRACT

A disposal method for waste fabric containing polyester, spandex, and dye includes the following steps: step (a): providing a waste fabric containing polyester, spandex, and dye; and step (b): performing a first-stage treatment including elution on the waste fabric to obtain a first liquid material and a first solid material. The first-stage treatment includes elution with a cosolvent mixed with an oxidant. The first solid material includes recycled polyester, and/or the first liquid material includes recycled spandex or degraded spandex.

9 Claims, 1 Drawing Sheet

(56) References Cited

U.S. PATENT DOCUMENTS

| | | | |
|---|---|---|---|
| 5,241,066 | A | 8/1993 | Davis et al. |
| 5,849,804 | A | 12/1998 | Sarian et al. |
| 5,889,142 | A | 3/1999 | Mohajer et al. |
| 5,898,063 | A | 4/1999 | Stefandl |
| 6,140,463 | A | 10/2000 | Stefandl |
| 2013/0296525 | A1 | 11/2013 | Waibel et al. |
| 2023/0127947 | A1 | 4/2023 | Liao et al. |
| 2024/0092991 | A1* | 3/2024 | Titcomb ............ D01F 6/62 |

FOREIGN PATENT DOCUMENTS

| | | |
|---|---|---|
| CN | 110790980 | 2/2020 |
| CN | 111621059 | 9/2020 |
| CN | 111868316 | 10/2020 |
| CN | 113073461 | 7/2021 |
| JP | H09255810 | 9/1997 |
| JP | H10195233 | 7/1998 |
| JP | H10512909 | 12/1998 |
| JP | 2018534184 | 11/2018 |
| WO | 2020130825 | 6/2020 |

OTHER PUBLICATIONS

Yunjie Yin et al., "Removal of spandex from nylon/spandex blended fabrics by selective polymer degradation", Textile Research Journal, Jan. 1, 2014, pp. 16-27.

"Office Action of Taiwan Related Application, Application No. 110139088", issued on Sep. 5, 2022, p. 1-p. 6.

"Office Action of Taiwan Related Application, Application No. 111102618", issued on Nov. 17, 2022, p. 1-11.

"Office Action of Taiwan Counterpart Application", issued on May 15, 2024, p. 1-p. 7.

"Office Action of U.S. Appl. No. 17/568,730", issued on Nov. 4, 2024, p. 1-p. 30.

"Office Action of Taiwan Counterpart Application", issued on Nov. 17, 2022, p. 1-p. 8.

\* cited by examiner

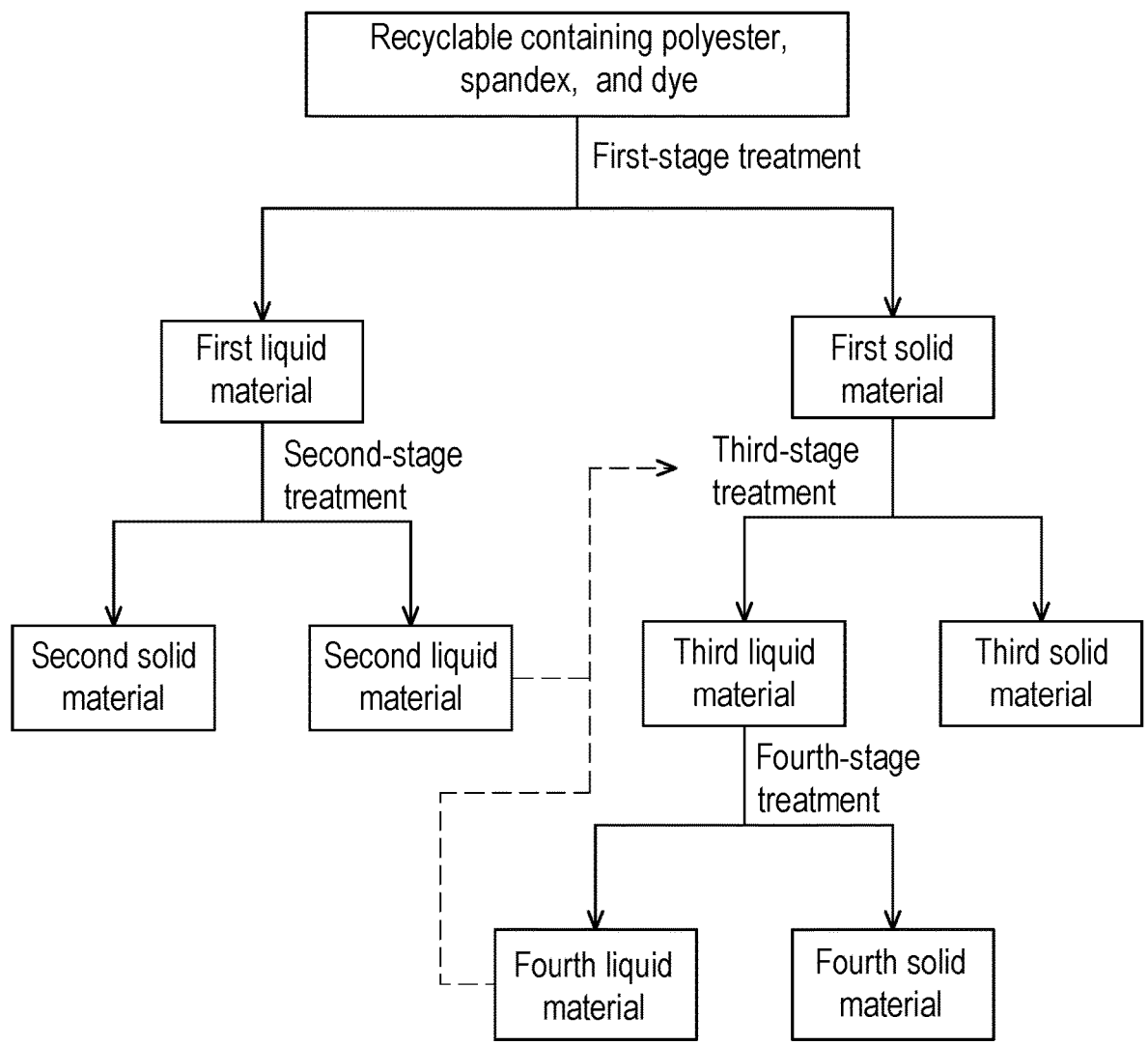

DISPOSAL METHOD FOR WASTE FABRIC CONTAINING POLYESTER, SPANDEX, AND DYE

CROSS-REFERENCE TO RELATED APPLICATION

This application is a continuation-in-part application of and claims the priority benefit of U.S. patent application Ser. No. 17/568,730, filed on Jan. 5, 2022, now allowed, which claims the priority benefit of Taiwan application serial no. 110139088, filed on Oct. 21, 2021. This application also claims the priority benefit of Taiwan application serial no. 111102619, filed on Jan. 21, 2022. The entirety of the above-mentioned patent applications is hereby incorporated by reference herein and made a part of this specification.

BACKGROUND

Technical Field

The disclosure relates to a disposal method for waste fabric, particularly to a disposal method for waste fabric containing polyester, spandex, and dye.

Description of Related Art

Polyester fibers and spandex fibers are fabrics commonly seen in the market and our daily lives. For example, polyester fibers may be co-woven with spandex fibers and then made into all kinds of fabric, such as hats, clothes, pants, skirts, and socks, using conventional approaches in textile or garment industry. It has become a research in progress to recycle polyester and/or spandex in these co-fabrics and/or dispose the polyester wastes.

SUMMARY

The disclosure is directed to a disposal method for waste fabric containing polyester, spandex, and dye which reduces the overall usage amount of cosolvents, increases the recycle amount, and/or improves the quality of polyester and/or spandex.

The disclosure provides a disposal method for waste fabric containing polyester, spandex, and dye, which includes following steps: step (a): providing a waste fabric containing polyester, spandex, and dye; and step (b): performing a first-stage treatment including elution on the waste fabric to obtain a first liquid material and a first solid material. The first-stage treatment includes elution with a cosolvent mixed with an oxidant. The first solid material includes recycled polyester, and/or the first liquid material includes recycled spandex or degraded spandex.

In the disclosure, it is found that decolorization, including the physical removal of dyes from fibers and the removal of chromophores, of the oxidant may be improved in an environment of cosolvents, improving the hue quality of the recycled fibers and increasing the economic value of recycling.

Based on the above description, through the above steps, the disposal method for waste fabric containing polyester, spandex, and dye of the disclosure may reduce the overall usage amount of cosolvents, increase the recycle amount, and/or improve the quality of spandex and/or polyester.

BRIEF DESCRIPTION OF THE DRAWINGS

The FIGURE is a partial schematic flowchart of a disposal method for waste fabric containing polyester, spandex, and dye according to an embodiment of the disclosure.

DESCRIPTION OF THE EMBODIMENTS

In the following detailed description, for the sake of explanation and not limitation, exemplary embodiments revealing specific details are set forth to provide a thorough understanding of various principles of the disclosure. However, it is obvious to those skilled in the art that, benefiting from the disclosure, the disclosure may be practiced in other embodiments that depart from the specific details disclosed herein. In addition, the description of well-known devices, methods, and materials may be omitted so as not to obscure the description of various principles of the disclosure.

A range may be expressed herein as from "about" a specific value to "about" another specific value, and may also be directly expressed as a specific value and/or to another specific value. When expressing the range, another embodiment includes from the one specific value and/or to another specific value. Similarly, when the value is expressed as an approximate value by using the antecedent "about," it is understood that the specific value forms another embodiment. It is further understood that an endpoint of each range is obviously related to or independent from the other endpoint.

In the specification, non-limiting terms (such as "possible," "may be," "for example," or other similar terms) are unessential or optional implementations, inclusions, additions or existences.

Unless otherwise defined, all terms (including technical and scientific terms) used herein have the same meaning as commonly understood by one of ordinary skill in the art to which this disclosure belongs. It is further understood that terms, such as those defined in commonly used dictionaries, should be interpreted as having a meaning that is consistent with their meaning in the context of the relevant art and will not be interpreted in an idealized or overly formal sense unless expressly so defined herein.

[Recyclables]

Recyclables containing polyester, spandex, and dye are provided.

In an embodiment, a method of obtaining recyclables includes, for example, collecting various types of recyclables or wastes containing spandex and polyester; and performing corresponding sorting according to types, colors, and/or usage purposes of the aforementioned recyclables. The aforementioned recyclables includes, for example, clothing, but the disclosure is not limited thereto. Generally, a label on regular clothing may indicate a used fiber composition.

In an embodiment, the recyclable containing spandex and polyester may be further subjected to one of following pre-treatments (i.e., the treatments before subsequent treatment; it is essentially still recyclable): removing objects (such as: clips, fasteners, ornaments, labels and/or other objects obviously not containing spandex and polyester) on the recyclable; performing preliminary cleaning on the recyclable (such as washing stains, throwing off impurities, etc., but the disclosure is not limited thereto); using physical processes (such as: shearing, trimming, cutting or chopping, but the disclosure is not limited thereto) to reduce a single size of the recyclable; and/or, drying the recyclable.

In an embodiment, the method of obtaining the recyclable may also include, for example, directly purchasing the processed recyclable containing spandex and polyester (for example, discarded clothing, to which the disclosure is not limited).

It should be noted that the term "spandex" in the specification includes polymers commonly referred to as spandex or polyurethane elastomeric fibre. In fabric applications, common names of products containing spandex polymers include, for example, Acepora, Creora, Dorlastan, Elaspan, ESPA, INVIYA, Linel, Lycra, Neolon, ROICA, etc. Spandex may be formed by subjecting a prepolymer and a diamine to a chain extension reaction. In the aforementioned chain extension reaction, the solvent used is usually dimethylformamide (DMF) or dimethylacetamide (DMAc). Spandex may include polyester spandex or polyether spandex. In the specification, spandex it is particularly referred to polyester spandex. The prepolymer used in the chain extension reaction that forms polyester spandex may be formed by the reaction between glycol (e.g., ethylene glycol (EG)) and diisocyanate monomer.

It should be noted that the term "polyester" in the specification includes polymers commonly referred to as polyesters, particularly aromatic polyesters, and particularly refers to polyesters derived from purified terephthalic acid (PTA) and ethylene glycol (EG) (i.e., polyethylene terephthalate (PET)).

In addition, the polyester in the specification may also be, for example, polytrimethylene terephthalate, polybutylene terephthalate, polyethylene naphthalate, or a combination thereof materials. In the embodiment, the polyester is preferably polyethylene terephthalate, polytrimethylene terephthalate or a combination thereof. In addition, a copolymer may also be used, which specifically refers to a copolymer that may be obtained by using two or more dicarboxylic acids and/or two or more diol components.

In an embodiment, the dyes used in the fabric are mostly organic dyes. For example, azo dyes (such as monoazo dyes and disazo dyes) are commonly used to dye spandex or polyester. The adhesion of organic dyes to polymers is generally better. Note that the disclosure does not limit the types of the organic dyes.

In an embodiment, the dyes used in the fabric do not contain inorganic dyes as most inorganic dyes contain heavy metal elements, which may easily cause allergies or discomfort to the human body.

[First-Stage Treatment]

A first-stage treatment is performed on the aforementioned recyclable to obtain a first liquid material and a first solid material.

It should be noted that the term "liquid material" used herein is not limited to that the material must be completely liquid. For example, the "liquid material" may include a liquid material; and a suspended substance suspended in or suspended on the liquid. A particle size of the above suspended substance may be 1 millimeter (mm) or less; or, according to the ASTM E11-01 standard, the above suspended substance may pass through a sieve with a mesh number of 18 or greater. For another example, the "liquid material" may include polymer colloid or other similar colloids.

It should be noted that the term "solid material" in the specification is not limited to that the material must be completely solid. For example, the "solid material" may include a solid; and a liquid attached to the solid or located between two solids by capillary phenomena. The "solid material" may be dried by an appropriate method (such as heating and/or vacuum drying) to obtain the solid with almost no liquid. Regarding a total weight of the "solid material," a weight of the solid after drying may be about 80% or more; which is preferably about 90% or more; and more preferably about 95% or more.

In the embodiment, the first-stage treatment may include soaking the recyclables in a mixed liquor containing organic solvent and water (hereinafter referred to as "cosolvent") (which is a process referred to elution). For example, the aforementioned recyclables may be immersed in a cosolvent mixed with an oxidant; or, the aforementioned recyclables may be immersed in a cosolvent, before the oxidant is then mixed thereto. And then, the first liquid material and the first solid material may be separated from each other with a suitable process (for example, by filtering with a screen; but the disclosure is not limited thereto).

In an embodiment, in the first-stage treatment, the weight ratio of the recyclables to the cosolvent mixed with an oxidant (i.e., the weight of the recycled product: the weight of the cosolvent mixed with an oxidant) may be about 1:8 to 1:30. Preferably, in the first-stage treatment, the weight ratio of the recyclables to the cosolvent mixed with an oxidant may be about 1:10 to 1:15.

In an embodiment, in the elution of the first-stage treatment, the recyclables may be immersed in a cosolvent mixed with an oxidant and be heated to about 80° C. to 160° C. Preferably, it may be heated to about 90° C. to 150° C. above the glass transition temperature of polyester. If the heating temperature is too low (e.g., less than 80° C.), the capacity utilization rate may be poor due to the slow reaction. And if the heating temperature is too high (e.g., higher than 160° C.), the organic dyes may be decomposed or the decolorization may be carried out poorly (e.g., excessive oxidants causes self-redox reactions), and/or there may be concerns about industrial safety.

In an embodiment, in the elution of the first-stage treatment, the recyclables may be immersed in a cosolvent mixed with an oxidant, stirred and/or left standing for 1 hour or more. Preferably, the stirring and/or standing process takes about 1 hour to 9 hours. More preferably, the stirring and/or standing process takes about 2 hours or more. Even more preferably, the stirring and/or standing process takes about 2 hours to 8 hours.

In an embodiment, in the elution of the first-stage treatment, the recyclables may be immersed in a cosolvent mixed with an oxidant and be heated (the heating temperature may be as described above); in addition, stirring and/or standing (the stirring and/or standing time may be as described above) during the heating process.

In an embodiment, elution of the first-stage treatment may be performed by using mixed liquor containing an amide solvent and water.

In an embodiment, a more suitable amide solvent may include dimethylformamide, dimethylacetamide, or a combination thereof. One of the reasons may be that dimethylacetamide or dimethylformamide is the solvent more commonly used for the reaction of synthesizing spandex.

In an embodiment, a more suitable amide solvent may include dimethylformamide. Dimethylformamide may have better solubility for spandex than dimethylacetamide when used at the same amount as dimethylformamide.

In an embodiment, in a cosolvent mixed with an oxidant, a concentration of an organic solvent in the cosolvent is about 20 wt % (weight percent) to 95 wt % based on the total composition of the cosolvent mixed with an oxidant. Preferably, the concentration of the organic solvent is about 30 wt % to 90 wt % based on the total composition of the cosolvent mixed with an oxidant.

For example, the concentration of dimethylformamide is about 20 wt % to 95 wt % based on the total composition of dimethylformamide-water cosolvent mixed with an oxidant. Preferably, the concentration of dimethylformamide is about 30 wt % to 90 wt % based on the total composition of dimethylformamide-water cosolvent mixed with an oxidant.

In an embodiment, the oxidant used in the elution of the first-stage treatment is an inorganic oxidant. Inorganic oxidants may include hydrogen peroxide, chlorates (e.g., sodium chlorate or calcium chlorate), hypochlorite (e.g., calcium hypochlorite) or sodium hypochlorite), perchlorate, ozone, nitric acid, nitrate, perborate (e.g., sodium perborate), permanganate (e.g., potassium permanganate), dichromate (e.g., sodium dichromate), or a combination thereof.

In an embodiment, the inorganic oxidant used in the elution of the first-stage treatment includes hydrogen peroxide, hypochlorite, or ozone. The reduction products of hydrogen peroxide are usually water, oxygen or hydroxide. The hypochlorite reduction product is typically chloride ion. The ozone reduction product is typically oxygen. Hydrogen peroxide, hypochlorite, or ozone is easier to be used in application and/or treatment (e.g., waste liquid or waste gas treatment, but the disclosure not limited thereto).

In an embodiment, the oxidant is suitable for oxidizing organic dyes in an environment of cosolvents to decompose or decolorize them. Therefore, the cosolvent containing oxidants has both the effects of separation and decolorization on polyester-spandex blended fabrics containing dyes. That is to say, compared with the process of "dissolving or degrading spandex with a solvent without an oxidant, and after the polyester-spandex is separated, removing the dye for color removal (using an oxidant, for example)," the method of this embodiment or similar embodiments may further improve the recycling quality of polyester and spandex, and may improve the recycling value.

In an embodiment, in the cosolvent mixed with an oxidant, the concentration of the oxidant is about 0.5 wt % to 10 wt % based on the total composition of the cosolvent mixed with an oxidant. Preferably, the concentration of the oxidant may be about 1 wt % to 8 wt % based on the total composition of the cosolvent mixed with an oxidant. If the concentration of the oxidant is too low (e.g., less than 0.5 wt %), the organic dyes may be decomposed or the decolorization may be carried out poorly. If the concentration of oxidant is too high (e.g., higher than 10 wt %), there may be concerns about industrial safety.

In an embodiment, the oxidant may decompose the organic dye so that it (i.e., the decomposed organic dye) does not have the original color (i.e., the fading of color).

In an embodiment, the oxidant may change part of the functional groups of the organic dye, so that it (i.e., the organic dye after structural modification) may be easily detached from other polymers (such as polyester or spandex) (i.e., decolorization).

In an embodiment, the decomposed or structurally modified organic dye may be more easily dissolved in the solvent by the treatment with the oxidant. For example, decomposed or structurally modified organic dyes may be more readily soluble in water or organic solvents.

In an embodiment, the first solid material may include other non-spandex polymers (such as polyester). However, it should be noted that the disclosure does not exclude that the first solid material further includes a small amount of spandex.

In an embodiment, the first liquid may include a cosolvent and spandex/degraded spandex, spandex suspension, or degraded spandex suspension dissolved in the cosolvent. However, it should be noted that the disclosure does not exclude that the first liquid material further includes a small amount of non-spandex polymers.

In an embodiment, the first liquid may not contain oxidants. For example, hydrogen peroxide may be decomposed into water and oxygen when heated. For another example, hydrogen peroxide that has not reacted with the dye may be decomposed into water and oxygen when heated.

In an embodiment, regarding a total amount of spandex in the aforementioned recyclable, the amount of spandex in the first liquid material is about 75 wt % to 90 wt %, and the amount of spandex in the first solid material is correspondingly about 25 wt % to 10 wt %.

In an embodiment, the recycle amount or quality of spandex and/or polyester may be improved by the cosolvent mixed with an oxidant.

In an embodiment, the color of the recycled polyester may be close to white. According to the International Commission on Illumination (CIE), based on the CIE 1931 color space, if the color brightness (i.e., the $L^*$ value) of the recycled material containing polyester, spandex, and dyes is about 20, then the color brightness of the polyester recovered by the above method may be about 75 or more, the $a^*$ value may be about $-4$ to $+4$, and the $b^*$ value may be about $-8$ to $+8$.

In an embodiment, the utilization value of recycled materials (e.g., recycled spandex and/or recycled polyester) may be increased by improving the whiteness.

[Second-Stage Treatment]

In an embodiment, a second-stage treatment may be performed on the aforementioned first liquid material to obtain a second liquid material and a second solid material.

In an embodiment, the second-stage treatment may include dilution. For example, a non-inorganic solvent (such as water) used in the elution in the aforementioned first-stage treatment may be added to the first liquid material, and then the second liquid material and the second solid material may be separated from each other by an appropriate method (such as: filtering with a screen or standing still for separation, but the disclosure is not limited thereto).

In an embodiment, the method of the second-stage treatment may further include cooling the solution after adding the aforementioned non-inorganic solvent to the aforementioned first liquid material (for example, cooling to the room temperature (about 25° C.); or, cooling to below the room temperature and above the freezing point), but the disclosure is not limited thereto.

In an embodiment, the method of the second-stage treatment may further include stirring and/or leaving the solution to stand still (for example: stirring for 3 minutes and standing still for 30 minutes or more, or, stirring for 5 minutes and standing still for 60 minutes or more) after adding the aforementioned non-inorganic solvent to the aforementioned first liquid material, but the disclosure is not limited thereto.

In an embodiment, the first-stage treatment may include performing the elution of the first-stage treatment by using a dimethylformamide-water cosolvent containing oxidants and 20 wt % to 95 wt % dimethylformamide, and the second-stage treatment may include adding water to the aforementioned first liquid material to reduce a concentration of the dimethylformamide in the solution to about 20 wt % or lower.

In an embodiment, the second solid material may include spandex.

In an embodiment, the second liquid material may include a cosolvent and spandex/degraded spandex, spandex suspension, or degraded spandex suspension dissolved in the cosolvent. A concentration of the organic solvent in the second liquid material is lower than a concentration of the organic solvent in the first liquid material.

In an embodiment, it is possible that the second liquid material does not contain oxidant.

[Third-Stage Treatment]

In an embodiment, a third-stage treatment may be performed on the aforementioned first solid material to obtain a third liquid material and a third solid material.

In an embodiment, the third-stage treatment may include elution. In an embodiment, a process of the elution of the third-stage treatment may be similar to the process of the elution of the first-stage treatment. For example, the aforementioned first solid material may be immersed in a cosolvent, and then the third liquid material and the third solid material may be separated from each other by a suitable method (such as filtering with a screen, but the disclosure is not limited thereto).

In an embodiment, the elution of the third-stage treatment may be to immerse the first solid material in a cosolvent for heating (for example, heated to about 70±5° C. to 100±5° C.), but the disclosure is not limited thereto.

In an embodiment, the elution of the third-stage treatment may be to immerse the first solid material in a cosolvent and stir and/or leave for standing still (for example, stirring and/or standing still for more than 30 minutes; or, stirring and/or standing still for more than 60 minutes), but the disclosure is not limited thereto.

In an embodiment, an organic solvent used in the elution of the third-stage treatment may be the same or similar to the organic solvent used in the elution of the first-stage treatment.

In an embodiment, a concentration of an organic solvent in the cosolvent of the elution in the third-stage treatment is different from a concentration of an organic solvent in the cosolvent of the elution in the first-stage treatment; and the concentration of an organic solvent in the cosolvent of the elution in the third-stage treatment is different from a concentration of an organic solvent in the cosolvent of the second liquid material.

In an embodiment, a concentration of an organic solvent in the cosolvent of the elution in the third-stage treatment is less than a concentration of an organic solvent in the cosolvent of the elution in the first-stage treatment; and the concentration of an organic solvent in the cosolvent of the elution in the third-stage treatment is greater than a concentration of an organic solvent in the cosolvent of the second liquid material.

In an embodiment, the concentration of the oxidant in the solvent used in the elution in the third-stage treatment may be less than 0.5 wt %. In an embodiment, it is possible that the solvent used in the elution in the third-stage treatment does not contain oxidant.

In an embodiment, dimethylformamide with a purity of 99 wt % or more may be first mixed with a recycled dimethylformamide-water cosolvent with a concentration of about 20 wt % or less, and then the aforementioned mixed solution may be used as cosolvent for the elution of the third-stage treatment, such that an overall usage amount of dimethylformamide may be reduced. In an embodiment, a concentration of the dimethylformamide in the aforementioned mixed solution may be 80 wt % or more, which may have a better dissolving effect on spandex.

In an embodiment, the aforementioned recycled dimethylformamide-water cosolvent may include the second liquid material obtained by performing the second-stage treatment (including: the second liquid material obtained in the current treatment cycle; and/or the second liquid material obtained in the previous treatment cycles after the method of the disclosure is performed by multiple times); and/or, a fourth liquid material obtained after a fourth-stage treatment (details thereof are as follows) performed in the previous treatment cycles (the method of the disclosure is performed by multiple times). In this way, the overall usage amount of the dimethylformamide may be reduced, and the spandex/degraded spandex, spandex suspension, or degraded spandex suspension dissolved in the cosolvent of the recycled dimethylformamide-water cosolvent (such as the second liquid material and/or the fourth liquid material) may be further subsequently recycled, so as to increase the recycle amount of spandex.

For example, a disposal method for waste fabric containing polyester, spandex, and dyes may include the following steps: step (a): providing a waste fabric containing polyester, spandex, and dyes; step (b): performing a first-stage treatment including elution on the waste fabric to obtain a first liquid material and a first solid material; step (c): performing a second-stage treatment on the first liquid material to obtain a second liquid material and a second solid material; and step (d): performing a third-stage treatment on the first solid material to at least obtain a third liquid material. During the processes, step (a), step (b), and step (d) may be performed N times, where N is greater than or equal to 1; step (c) may be performed M times, where M is less than or equal to N; and the elution of the N-th third-stage treatment includes performing an elution with the M-th second liquid material.

For another example, a disposal method for waste fabric containing polyester, spandex, and dyes may include the following steps: step (a): providing a waste fabric containing polyester, spandex, and dyes; step (b): performing a first-stage treatment including elution on the waste fabric to obtain a first liquid material and a first solid material; step (c): performing a second-stage treatment on the first liquid material to obtain a second liquid material and a second solid material; step (d): performing a third-stage treatment on the first solid material to at least obtain a third liquid material; and step (e): performing a fourth-stage treatment on the third liquid material (whose details are described later) to obtain a fourth liquid material and a fourth solid material. During the processes, step (a), step (b), step (d), and step (e) may be performed N times, where N is greater than or equal to 2; and the elution of the N-th third-stage treatment includes performing an elution with the P-th fourth liquid, wherein P is smaller than N.

In an embodiment, the third solid material may include other non-spandex polymers (such as polyester). However, it should be noted that the disclosure does not exclude that the third solid material further includes of a very small amount of spandex.

In an embodiment, a proportion of spandex in the third solid material (which may be a weight ratio of spandex to the entire third solid material) is less than a proportion of spandex in the first solid material (which may be a weight ratio of spandex to the entire first solid material).

In an embodiment, a proportion of polyester in the third solid material (which may be a weight ratio of polyester to the entire third solid material) is greater than a proportion of polyester in the first solid material (which may be a weight ratio of polyester to the entire first solid material).

In an embodiment, the third liquid material may include a cosolvent and spandex/degraded spandex, spandex suspension, or degraded spandex suspension dissolved in the cosolvent.

In an embodiment, regarding a total amount of spandex in the first solid material, the amount of spandex in the third liquid material may be about 90 wt % or more; or 95 wt % or more. In other words, through the two-stage elution (i.e., the elution in the first-stage treatment and the elution in the third-stage treatment), the spandex in the aforementioned recyclable may almost be dissolved or degraded and thus separated in the subsequent steps.

[Fourth-Stage Treatment]

In an embodiment, a fourth-stage treatment may be performed on the aforementioned third liquid material to obtain a fourth solid material and a fourth liquid material.

In an embodiment, the fourth-stage treatment may include dilution. For example, a non-organic solvent used in the elution in the aforementioned first-stage treatment or the aforementioned third-stage treatment may be added to the third liquid material, and then the fourth liquid material and the fourth solid material may be separated from each other by an appropriate method (such as: filtering with a screen or standing still for separation, but the disclosure is not limited thereto).

In an embodiment, the method of the fourth-stage treatment may further include cooling the solution after adding the aforementioned solvent to the aforementioned third liquid material (for example, cooling to the room temperature (about 25° C.); or, cooling to below the room temperature and above the freezing point), but the disclosure is not limited thereto.

In an embodiment, the method of the fourth-stage treatment may further include stirring and/or leaving the solution to stand still (for example: stirring for 3 minutes and standing still for 30 minutes or more, or, stirring for 5 minutes and standing still for 60 minutes or more) after adding the aforementioned non-organic solvent to the aforementioned third liquid material, but the disclosure is not limited thereto.

In an embodiment, the first-stage treatment may include performing the elution of the first-stage treatment by using a dimethylformamide-water cosolvent containing oxidants and 20 wt % to 95 wt % dimethylformamide, and the third-stage treatment may include performing the elution of the third-stage treatment by using two-stage dimethylformamide-water cosolvent with different concentrations, and the fourth-stage treatment may include adding water to the aforementioned third liquid material to reduce a concentration of the dimethylformamide in the solution to about 20 wt % or lower.

In an embodiment, the fourth solid material may include spandex.

In an embodiment, the fourth liquid material may include a cosolvent and spandex/degraded spandex, spandex suspension, or degraded spandex suspension dissolved in the cosolvent. A concentration of the organic solvent in the fourth liquid material is lower than a concentration of the organic solvent in the third liquid material.

[Recycling and Reuse of Spandex]

Recycling and reuse of spandex may be basically implemented on the second solid material and/or the fourth solid material including spandex in a suitable manner (such as spandex drawing or spandex granulation; but the disclosure is not limited thereto).

In an embodiment, the second solid material and/or the fourth solid material may be further washed with water to reduce the concentration of the organic solvent or other substances (such as decomposed or structurally modified organic dyes or decomposed or undecomposed oxidants, but the disclosure is not limited thereto) in the second solid material and/or the fourth solid material, but the disclosure is not limited thereto.

In an embodiment, the second solid material and/or the fourth solid material may be dried, but the disclosure is not limited thereto.

[Recycling and Reuse of Polyester]

Recycling and reuse of polyester may be basically implemented on the third solid material including polyester in a suitable manner (such as polyester granulation; but the disclosure is not limited thereto).

In an embodiment, the first solid material and/or the third solid material may be further washed with water to reduce the concentration of the organic solvent or other substances (such as decomposed or structurally modified organic dyes or decomposed or undecomposed oxidants, but the disclosure is not limited thereto) in the first solid material and/or the third solid material, but the disclosure is not limited thereto.

In an embodiment, the first solid material and/or the third solid material may be dried, but the disclosure is not limited thereto.

EXAMPLES AND COMPARATIVE EXAMPLE

The following examples and comparative example are shown to describe the disclosure, but not to limit the disclosure.

Example 1

A first-stage treatment: 20 grams (g) of polyester (PET)-spandex blended waste fabric (L=27%, 80% by weight of PET, 20% by weight of spandex) was put into a reaction tank of 1 liter (L), into which 100 g of water, 400 g of dimethylformamide, and 1.5 g of sodium hypochlorite were then added. As the mixture was stirred at a temperature of 120° C. for 6 hours, the spandex dissolved, whereas the PET retained its fibrous structure. The temperature was lowered to 40° C., and the PET (i.e., the first solid material) and the spandex slurry (i.e., the first liquid material) were separated by a 3 mm screen.

A second-stage treatment: the spandex and the cosolvent in the spandex slurry (i.e., the first liquid material) were separated by a 10 micrometer (μm) screen, and the spandex powder (i.e., the second solid material) was washed with 8 g of water. The aforementioned cosolvent separated by the 10 μm screen and the water used for washing may be further collected (i.e., the second liquid material).

A third-stage treatment: The PET fibers (i.e., the first solid material) were placed on a 3 mm screen, washed with the second liquid material, and then washed with 32 g of water. The aforementioned washed PET fibers may be collected (i.e., the third solid material). The aforementioned second liquid used for washing and the water used for washing may be further collected (i.e., the third liquid material).

A fourth-stage treatment: the spandex and the cosolvent in the third liquid material were separated by a 1 μm screen to obtain the fourth solid material and the fourth liquid material.

The PET fiber (i.e., the third solid material) was dried at 105° C. for 2 hours. The weight ratio of the pure PET fabric was 99.7%; L=84%, a=0.9, b=5.7, which were beneficial for recycling.

The measurement of the pure PET weight ratio was carried out as follows. 600 cc of sulfuric acid aqueous solution with a concentration of 75% by weight was poured into a flask of 1000 cubic centimeters (cc), and 3 g of the PET fabric sample as separated was obtained. The flask was heated to 50±5° C. and maintained so for 1 hour, during which the flash was shaken 1 time every 10 minutes. When the above process was finished, the liquid is removed by suction using a funnel with a 3 mm screen, and 200 cc of sulfuric acid aqueous solution with a concentration of 75% by weight was poured into the funnel to wash the fabric and was then removed by suction. Then, 200 cc of clean water was poured into the funnel to wash the fabric twice, and the liquid is removed by suction each time. After that, the treated PET fabric was placed in an oven to be dried at 105° C. for 2 hours and was then weighed. 2.986 g of the PET fabric was obtained, confirming that the weight ratio of the pure PET fabric was 99.5%. As the other examples and the comparative example described as follows also adopted the same measurement, the same description will not be repeated herein.

Example 2

The steps or processes were similar to those in [Example 1], except that the dimethylformamide was replaced by dimethylacetamide. The weight ratio of pure PET fabric as obtained is 99.3%; L=81%, a=1.4, and b=6.9, which were beneficial for recycling.

Example 3

The steps or processes were similar to those in [Example 1], except that the sodium hypochlorite was replaced by calcium hypochlorite. The weight ratio of pure PET fabric as obtained is 99.6%; L=85%, a=0.9, and b=3.4, which were beneficial for recycling.

Comparative Example 1

A process similar to the first-stage treatment: 20 g of PET-spandex blended waste fabric (L=27%, 80% by weight of PET, 20% by weight of spandex) was put it into a 1 L reaction tank, into which 100 g of water and 400 g of dimethylformamide were then added. As the mixture was stirred at a temperature of 110° C. for 6 hours, the spandex dissolved, whereas the PET retained its fibrous structure. The temperature was lowered to 40° C., and the PET (i.e., a material similar to the first solid material; abbreviated as: the quasi-first solid material) and the spandex slurry (i.e., a material similar to the first liquid material; abbreviated as: the quasi-first liquid material) were separated by a 3 mm screen.

A process similar to the second-stage treatment: the spandex and the cosolvent in the spandex slurry (i.e., the quasi-first liquid material) were separated by a 10 μm screen, and the spandex powder (i.e., a material similar to the second solid material; abbreviated as: the quasi-second solid material) was washed with 8 g of water. The aforementioned cosolvent separated by the 10 μm screen and the water used for washing may be collected (i.e., a material similar to the second liquid material; abbreviated as: the quasi-second liquid material).

A process similar to the third-stage treatment: The PET fibers (i.e., the quasi-first solid material) were placed on a 3 mm screen and washed with the quasi-second liquid material, and then 32 g of water were used to wash the PET fibers (i.e., a material similar to the third solid material; abbreviated as: the quasi-third solid material). The aforementioned quasi-second liquid material for washing and the water used for washing may be further collected (i.e., a material similar to the third liquid material; abbreviated as: the quasi-third liquid material).

A process similar to the fourth-stage treatment: the spandex and the cosolvent in the quasi-third liquid material were separated by a 1 μm screen to obtain a solid material similar to the fourth solid material (abbreviated as: the quasi-fourth solid material) and a liquid material similar to the fourth liquid material (abbreviated as: the quasi-fourth liquid material).

The PET fibers (i.e., the quasi-third solid material) were dried at 105° C. for 2 hours, and the weight ratio of the pure PET fabric was 99.4%; L=57%, a=2.2, b=9.4. The PET fibers were grayish-yellow at this point and needed to be further decolorized for recycling.

INDUSTRIAL APPLICATION

By using the method of the disclosure, spandex or polyester in the recyclable may be recycled. In addition, the recycled spandex or polyester may be reused. The reuse method is, for example, but not limited to fabrication of fabrics, curtains, tires and other spandex-containing materials. The disposal method for recycled polyester includes physical reproduction or chemical reproduction. The physical reproduction includes using an extruder to melt the processed polyester and then extrude for pelletizing. The chemical reproduction includes using a chemical depolymerization solution to depolymerize the recycled polyester, and then repolymerizing monomers and/or oligomers obtained after depolymerization under specific conditions to perform granulating, where the chemical depolymerization solution may be water, methanol, ethanol, ethylene glycol, diethylene glycol or any combination thereof. The disposal method for the recycled polyester may be deduced by referring to Taiwan patent application No. 110113065 and/or U.S. patent application Ser. No. 17/320,247.

What is claimed is:

1. A disposal method for waste fabric containing polyester, spandex, and dye, comprising:
   step (a): providing a waste fabric containing polyester, spandex, and dye;
   step (b): performing a first-stage treatment on the waste fabric to obtain a first liquid material and a first solid material;
   step (c): performing a second-stage treatment on the first liquid material to obtain a second liquid material and a second solid material;
   step (d): performing a third-stage treatment on the first solid material to at least obtain a third liquid material and a third solid material; and
   step (e): performing a fourth-stage treatment on the third solid material to obtain a fourth liquid material and a fourth solid material,
   wherein the first-stage treatment comprises a first elution process with a cosolvent mixed with an oxidant;
   wherein a concentration of an organic solvent in the second liquid material is lower than a concentration of the organic solvent in the first liquid material;

wherein the first solid material comprises recycled polyester;

wherein the first liquid material comprises recycled spandex or degraded spandex, or the second solid material comprises recycled spandex;

wherein a concentration of the oxidant used in the first elution process of the first stage treatment is 0.5 wt %~10 wt %;

wherein the first elution process of the first-stage treatment further comprises heating to 80° C. to 150° C.;

wherein based on a total amount of the spandex in the waste fabric, an amount of the spandex in the first liquid material is 75 wt % to 90 wt %, and an amount of the spandex in the first solid material is 25 wt % to 10 wt %;

wherein the third-stage treatment comprises a second elution process;

wherein the fourth-stage treatment comprises a dilution process;

wherein a concentration of the organic solvent in the fourth liquid material is lower than a concentration of the organic solvent in the third liquid material;

wherein the third solid material comprises recycled polyester, or the fourth solid material comprises recycled spandex;

wherein the step (a), the step (b), the step (d) and the step (e) are performed N times, where N is greater than or equal to 2;

wherein the step (c) is performed M times, where M is less than or equal to N; and wherein the second elution process of the third stage treatment for the N-th time is performed comprising using the second liquid obtained from the second stage treatment for the M-th time; or wherein the second elution process of the third stage treatment for the N-th time is performed comprising using the fourth liquid obtained by the fourth stage treatment for the P-th time, wherein P is less than N.

2. The disposal method for waste fabric containing polyester, spandex, and dye according to claim 1, wherein the first elution process of the first-stage treatment adopts the cosolvent comprising an amide solvent and water.

3. The disposal method for waste fabric containing polyester, spandex, and dye according to claim 1, wherein the organic solvent used in the cosolvent is dimethylformamide or dimethylacetamide.

4. The disposal method for waste fabric containing polyester, spandex, and dye according to claim 1, wherein the oxidant is an inorganic oxidant selected from the group consisting of hydrogen peroxide, permanganate, ozone, nitric acid, nitrate, chlorate, perchlorate, hypochlorite, perborate, dichromic acid salt, and combinations thereof.

5. The disposal method for waste fabric containing polyester, spandex, and dye according to claim 1, wherein a concentration of the organic solvent in the cosolvent used in the first elution process of the first-stage treatment is 20 wt % to 95 wt %.

6. The disposal method for waste fabric containing polyester, spandex, and dye according to claim 1, wherein the first elution process is performed at a temperature higher than a glass transition temperature of polyester.

7. The disposal method for waste fabric containing polyester, spandex, and dye according to claim 1, wherein in step (b), a weight ratio of the waste fabric to the cosolvent mixed with the oxidant ranges from 1:8 to 1:30.

8. The disposal method for waste fabric containing polyester, spandex, and dye according to claim 1, wherein the first-stage treatment takes 1 hour to 9 hours.

9. The disposal method for waste fabric containing polyester, spandex, and dye according to claim 1, wherein the recycled polyester has an L value of 75% or more, an a* value ranges from −4 to +4, and a b* value ranges from −8 to +8.

* * * * *